United States Patent [19]

Otto

[11] 4,325,591

[45] Apr. 20, 1982

[54] SEALED AND UNITIZED BEARING

[75] Inventor: Dennis L. Otto, Malvern, Ohio

[73] Assignee: The Timken Company, Canton, Ohio

[21] Appl. No.: 190,513

[22] Filed: Sep. 25, 1980

[51] Int. Cl.³ .............................................. F16C 33/78
[52] U.S. Cl. .................................... 308/187.2; 277/50;
308/DIG. 1
[58] Field of Search ..................... 308/187.2, DIG. 11,
308/187.1, 36.3, 36.1; 277/50, 189, 35

[56] References Cited

U.S. PATENT DOCUMENTS

| | | | |
|---|---|---|---|
| 2,879,114 | 3/1959 | Bowen | 277/35 |
| 3,396,975 | 8/1968 | Otto | 277/50 |
| 3,494,682 | 2/1970 | Keller | 308/187.1 |
| 4,062,603 | 12/1977 | Orain | 308/DIG. 11 |

Primary Examiner—Lenard A. Footland
Attorney, Agent, or Firm—Gravely, Lieder & Woodruff

[57] ABSTRACT

A two row tapered roller bearing having a one-piece double cup and separate cone assemblies fitted into the ends of the cup is unitized by seals which close the ends of the bearing. Each seal includes a metal seal case pressed into a bore that opens out of the cup and an elastomeric seal element bonded to the case and contacting the cone at that end of the cup out of which the bore opens. The seal case has a cylindrical wall along which an interference fit exists between it and the surface of the end bore into which it is fitted. At its end the cylindrical wall is curled back upon itself to form a locking lip, and this lip fits into an undercut located between the end bore and the adjacent tapered raceway of the double cup. The curled locking lip substantially increases the force required to extract the seal, in that the lip must be straightened or uncurled in order to withdraw the cylindrical wall of the seal case from the end bore. Yet, the curled lip does not diminish the effectiveness of the interference fit in accurately and securely positioning the seal case. Each seal case is configured such that it blocks the adjacent cone and its complement of rollers before the rollers contact and perhaps damage the lips of the elastomeric seal element.

19 Claims, 7 Drawing Figures

FORCE

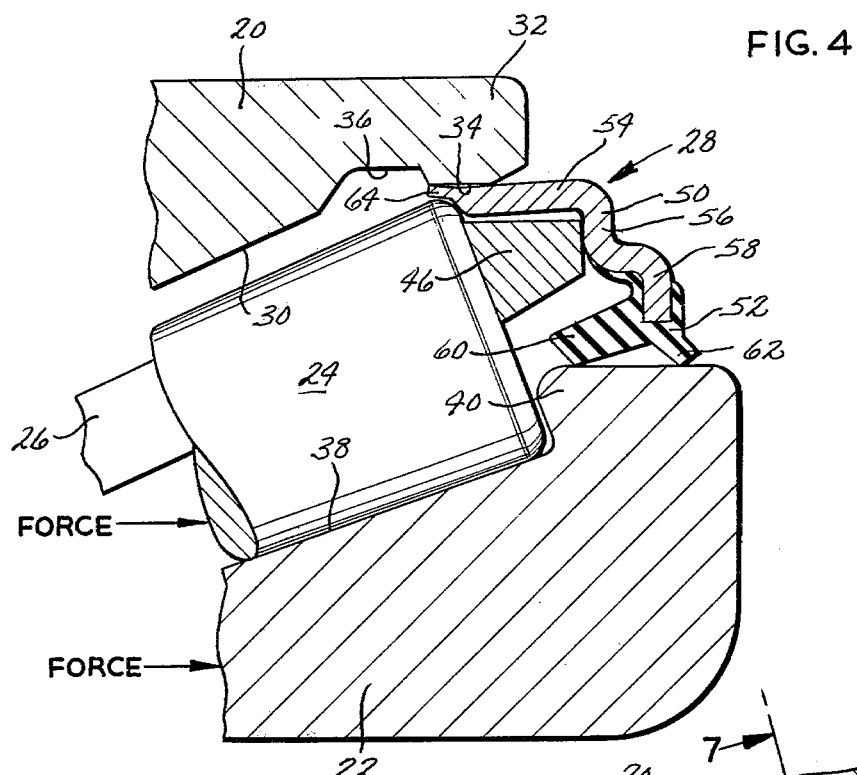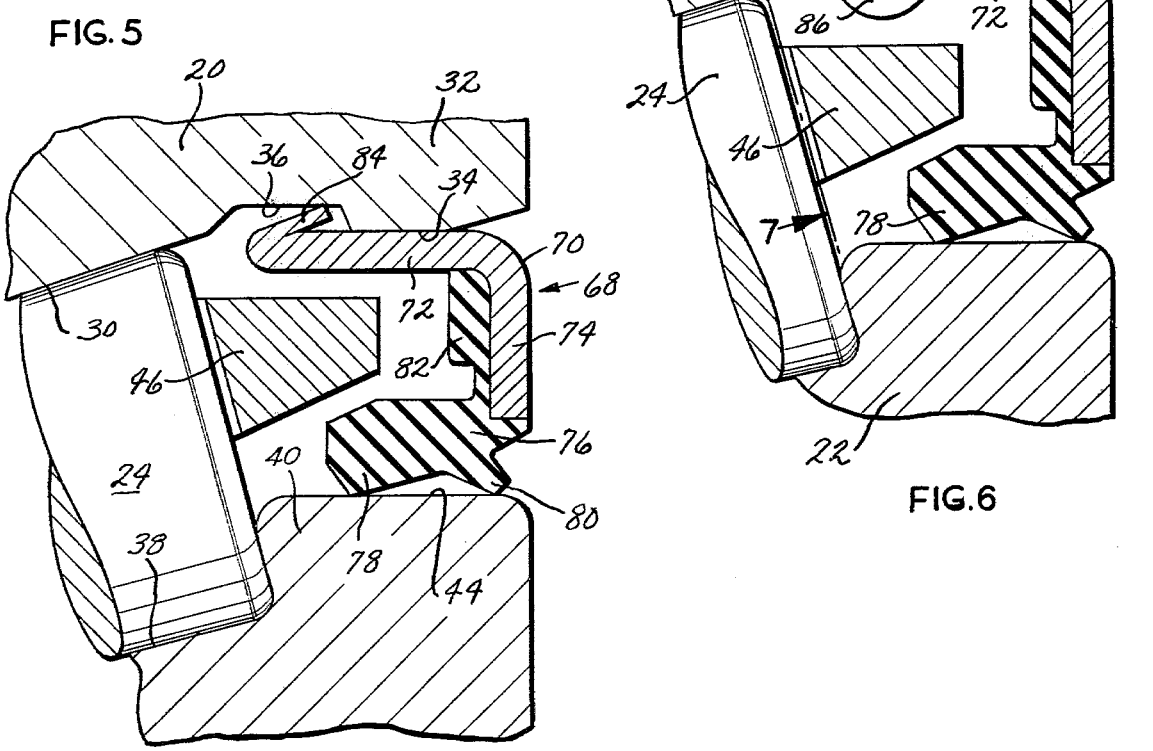

SEALED AND UNITIZED BEARING

BACKGROUND OF THE INVENTION

This invention relates in general to antifriction bearings and more particularly to a bearing arrangement that is unitized or held together by an end closure, such as a seal, and to a seal for such a bearing arrangement.

It has long been the practice for bearing manufacturers to supply railroad bearings in a unitized, preset, prelubricated, and sealed condition. This enables the bearing to be easily installed on an axle journal, for in doing so one need not be concerned with adjusting the bearing, keeping track of its multitude of parts, or adding lubricant to it. The typical railroad bearing of the tapered roller variety has a double cup (outer race) and a pair of cones (inner race) which are separated by a spacer sleeve. Tapered rollers are arranged in two rows between the raceways of the cup and the cones, and these rollers are held around the cones by cages, even when the cones are withdrawn from the cup. The whole arrangement is unitized for handling purposes by seal cases which are secured to the ends of the cup and prevent the cone assemblies from moving out of the cup. A typical railroad bearing of the type manufactured by The Timken Company is illustrated as U.S. Pat. No. 3,494,682.

One method of securing the seal cases is to merely force them into the ends of the cup with a press fit. To enhance the retention each seal case is normally provided with locking bead that projects into an undercut in the bore into which the seal case is pressed. Even so conventional seal cases can on occasion work loose as their ability to be retained in the bearing cup is limited.

With the advent of front wheel drive automobiles, automobile manufacturers have discovered that many of the principles incorporated into tapered roller railroad bearings are equally desirable in the front wheel bearings for their automobiles. In this regard, front wheel drive automobiles are generally lighter than their rear wheel drive counterparts, but most of the weight is concentrated over the front wheels, indeed, significantly more than in a comparable rear wheel drive automobile. This makes tapered roller bearings ideally suited for front wheel drive automobiles because such bearings are capable of carrying high radial loads as well as substantial thrust loads—all with a high degree of stability.

Automobile manufacturers find it convenient to have the bearings preset and also unitized for handling purposes, since this facilitates the assembly of their front wheel units. Moreover, some manufacturers want the bearings to remain together even when the nut and stub shaft that normally clamp the two cones together are removed, this to prevent the inboard cone from walking off of the hub spindle, so to speak, under the induced load caused by the taper of the rollers. Others want to be able to strip the cones from the hub spindle over which they are pressed without having the entire bearing come apart.

Whatever the reason, it is in some automotive applications desirable to unitize the bearings not only to the extent that they will remain together for handling purposes, but further to the extent that they will remain unitized when their cones are subjected to substantial parting forces. Conventional press fits, even when supplemented with locking beads, do not provide the retention necessary to meet these requirements.

SUMMARY OF THE INVENTION

One of the principal objects of the present invention is to provide a bearing arrangement that is securely unitized by means of end closures which may take the form of seal cases. Another object is to provide an end closure or seal case which provides a significantly higher magnitude of retention than conventional seal cases, yet is installed with about the same amount of force. A further object is to provide a unitized bearing that is ideally suited for front wheel drive automobiles. An additional object is to provide a bearing having a double cup and a pair of cone assemblies within the cup, and in which the cone assemblies are retained in the cup even when substantial parting forces are applied to them. Still another object is to provide an end closure or seal case during improved retention characteristics in a bore provided with an undercut. These and other objects and advantages will become apparent hereinafter.

The present invention is embodied in a bearing arrangement having inner and outer races and a retention surface provided with an undercut. A closure member, which closes the end of the bearing, has a metal wall that frictionally engages the retention surface, and at its end the wall has a retaining lip that is turned back to overlie the wall. The retaining lip is received in the undercut. The invention also resides in a seal unit having a cylindrical wall and a retaining lip doubled back over the wall. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

FIG. 4 is a sectional view similar to FIG. 3, but showing the cone assembly thrust axially with sufficient force to dislodge the seal from the end of the double cup, in which case the locking lip on the seal case is uncurled;

FIG. 5 is a sectional view of a modified seal;

FIG. 6 is a sectional view of still another modified seal; and

DETAILED DESCRIPTION

Figure 1:
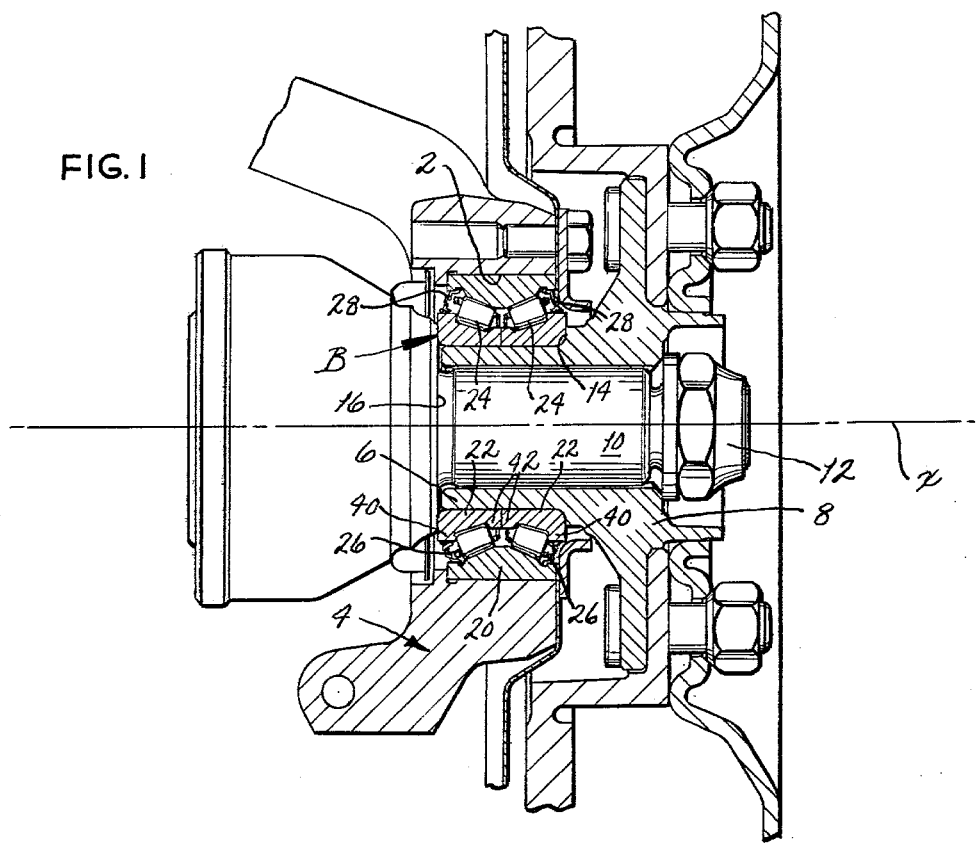
FIG. 1 is a sectional view of an automotive front wheel assembly of the type used on front wheel drive automobiles, with this assembly incorporating a sealed and unitized bearing constructed in accordance with and embodying the present invention.

Referring now to the drawings (FIG. 1), B designates a tapered roller bearing that is particularly suited for use as a front wheel bearing for a front wheel drive automobile. As such it fits into a bore 2 within a steering knuckle 4 and around a spindle 6 on a wheel hub 8, also known as a drive flange, so that the hub 8 can rotate relative to the knuckle 4. The bearing B, of course, permits a wheel on the hub 8 to rotate relative to the knuckle 4 and transmits radial loads, as well as axial loads in both directions, from the knuckle 4 to the hub 8. The hub 8 is driven by a splined stub shaft 10 which fits into the spindle 6 and the two are held together, with the bearing B clamped between them, by a nut 12 that threads over the end of the stub shaft 10 and against the outwardly presented face of the wheel hub 8. In this regard, the hub 8 has a shoulder 14 located at the end of the spindle 6, while the stub shaft 10 also has a shoulder 16. The two shoulders 14 and 16 face each other and are located at opposite ends of the bearing B, so that when the nut 12 is turned down, the shoulders 14 and 16 draw together and clamp the bearing B tightly between them. The bore 2, the hub 8, and the stub shaft 10 all have a common axis X which is also the axis of rotation for the bearing B.

The bearing B basically includes (FIG. 1) an outer race in the form of a double cup 20, an inner race in the form of a pair of cones 22 located within the cup 20, rolling elements in the form of tapered rollers 24 arranged in two rows of rollers 24 surrounding each cone 22, a cage 26 for each row of rollers 24 to maintain the proper spacings between the rollers 24, and seals 28 at the ends of the cup 20 for closing the annular spaces between the ends of the cup 20 and cones 22. Each cone 22 and its complement of rollers 24 and cage 26 are known as a cone assembly.

The double cup 20 fits snugly within the bore 2 of the knuckle 4 (FIG. 1), and indeed an interference fit exists between the two. Nevertheless the knuckle 4 carries a retention structure such as an integral shoulder, snap rings or a clamp to positively retain the cup 20 in the bore 2. The cup 20 has a pair of inwardly presented raceways 30 which taper outwardly away from the center of the bearing B so that the large diameter ends of the raceways 30 are located toward the ends of the cup 20. Beyond each raceway 30 the cup 20 is provided with a cup extension 32 having a short end bore 34 (FIG. 2) that is greater in diameter than the large end of the raceway 30 and opens out of the cup 20 at a slight chamfer 35. Each cup extension 32 is further provided with an annular groove or undercut 36 that is larger in diameter than the end bore 34 and separates the bore 34 from the adjacent raceway 30. That wall of the undercut 36 which is adjacent to the end bore 34 is located at a relatively steep angle a with respect to the surface of the bore 34. The angle a may range between 90° and 135°, but should be as close to 90° as practical.

Figure 2:
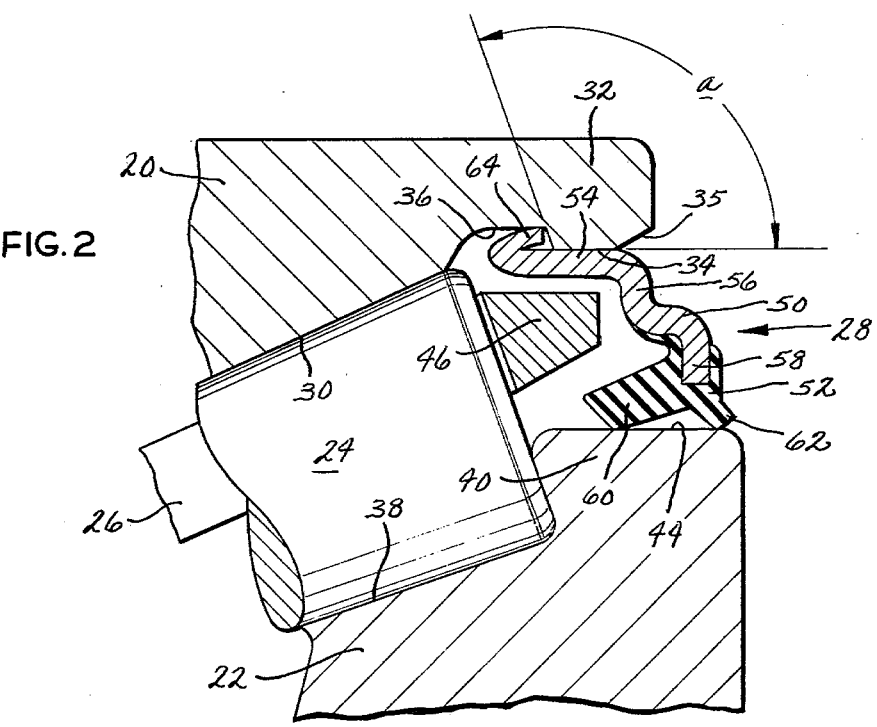
FIG. 2 is an enlarged sectional view showing the seal of the invention and the adjacent bearing components, with those components being in their normal operating positions.

The two cones 22 are pressed over the spindle 6 on the hub 8 and are located for the most part within the double cup 20 (FIG. 1). Each has an outwardly presented raceway 38 that is opposite to one of the raceways 30 of the cup 20. The cone raceways 38 taper downwardly toward each other, so that the large diameter ends of the raceways 38 are at the ends of the bearing B. Each cone 22 at the large diameter end of its raceway 38 has a thrust rib 40 and at the small diameter end has a retaining lip 42. The thrust rib 40 projects axially beyond the cup extension 32 and has a cylindrical sealing surface 44 (FIG. 2) that is presented outwardly. The back face for each cone 22 is on its thrust rib 40, and accordingly the back face for one cone 22 abuts against the shoulder 14 of the hub 8, while the back face of the other cone 22 abuts against the shoulder 16 of the stub shaft 10. The retaining ribs 42 for the two cones 22 project outwardly from their respective cone raceways 38 at a relatively steep angle on the order of a right angle. The front faces of the two cones 22 are on the retaining ribs 42 and abut midway between the ends of the cup 20.

The tapered rollers 24 are arranged in two rows between corresponding raceways 30 and 38 of the cup 20 and cones 22, respectively (FIG. 1). Their taper corresponds to those of the raceways 30 and 38 so line contact exists between the roller side faces and the raceways 30 and 38. This taper is on apex, meaning that the conical side faces of the rollers 24 of either row, if extended to an apex, would have those apexes located at a common point along the axis X of the bearing B. The large diameter end faces of the rollers 24 around each cone 22 abut against the thrust rib 40 for that cone, and this prevents the rollers 24 from being expelled when subjected to radial loads. Since the axial spacing between the two cup raceways 30 is established by reason of the integral construction of the cup 20 and the axial spacing between the two cone raceways 38 is established by the abutment of the cones 22 at their front faces, the bearing B is preadjusted. Thus, the nut 12 merely clamps the cones 22 together, but does not control the adjustment in the bearing B.

The cages 26 maintain the proper spacing between the rollers 24 of their respective rows and prevent the rollers 24 from falling away from their respective cones 22 when the cones 22 are removed from the cup 20. These components, that is a cone 22, its complement of rollers 24 and its cage 26, when held together by the cage 26, are known as a cone assembly. Each cage 26 has pockets in which its rollers 24 are received and further projects beyond the large diameter ends of the rollers 24 in the form of a large diameter end ring 46 (FIG. 2) which encircles the thrust rib 40.

The seals 28 close the annular spaces between the cup extensions 32 and the cone thrust rib 40 at each end of the bearing B, to both retain a lubricant within the interior of the bearing B and exclude dust, water, and other contaminants from the enclosed region. In addition, the seals 28 unitize the bearing B in that they prevent the cones 22, or more accurately, the cone assemblies, from being withdrawn from the cup 20, even when the cones 22 are subjected to substantial parting forces as might occur if the nut 12 and spindle 6 were removed and the vehicle rolled about without them. In this case, lateral parting forces are induced on the rollers 24 and cones 22 by the tapered geometry in the bearing B. The inboard cone 22, unless restrained, may work its way off of the spindle 6 and out of the cup 20 to thereby dislodge and damage the seal and otherwise render the bearing unserviceable. The outboard cone 22, however, by reason of its interference fit would tend to remain with the spindle 6 and unless restrained would come out of the cup 20. The outboard cone 22 also tends to move out of the cup 20 if one attempts to strip the cones 22 from the spindle 6 as in some maintenance procedures. The seals 28 interfere with the cone assemblies if they spread apart and in so doing after considerable resistance to the spreading forces.

Each seal 28 includes (FIG. 2) a metal seal case 50 and an elastomeric seal element 52 on the seal case 50. The former engages the cup 20 and remains fixed in position with respect to it, while the latter contacts the cylindrical surface 44 of the cone thrust rib 40.

With regard to the seal case 50, it has (FIG. 2) a cylindrical outer wall 54 that fits into one of the end bores 34 of the cup 20 such that an interference fit exists between the two. Thus, when the cylindrical wall 54 is unrestrained, it is slightly larger in diameter than the end bore 34 and this difference should range between 0.002 and 0.016 inches. The interference fit insures that the seal 28 locates properly with respect to the cup 20 and cone 22 insofar as the radial direction is concerned and further holds the seal 28 in the proper axial position under normal operating conditions. At its one end the cylindrical wall 54 merges into a radial end wall 56 that extends inwardly toward the thrust rib 40 on the cone 22. The radial end wall 56 in turn merges into a short offset 58 which projects axially outwardly and also radially inwardly and has the seal element 52 bonded to it. The outwardly presented surface of the radial wall 56 is flush with the end face of the cup 20, whereas the offset 58 projects axially beyond the cup 20. Even so, both the radial wall 56 and the offset 58 are located directly outwardly from the cylindrical sealing surface 44 of the rib 40, the radial wall 56 being generally centered with respect to that surface while the offset is disposed further toward the outer edge.

The seal element 52, which is bonded to the offset 58 on the seal case 50, includes (FIG. 2) a grease lip 60 and a dust lip 62. Both project obliquely toward the thrust rib 40 and have edges which contact the cylindrical sealing surface 44 of the rib 40. More specifically, the grease lip 60 extends generally toward the rollers 24 and is surrounded in its entirety by the seal case 50. The dust lip 62, which is considerably shorter than the grease lip 60, projects in the opposite direction and for the most part is outside of the seal case 50.

Figure 3:
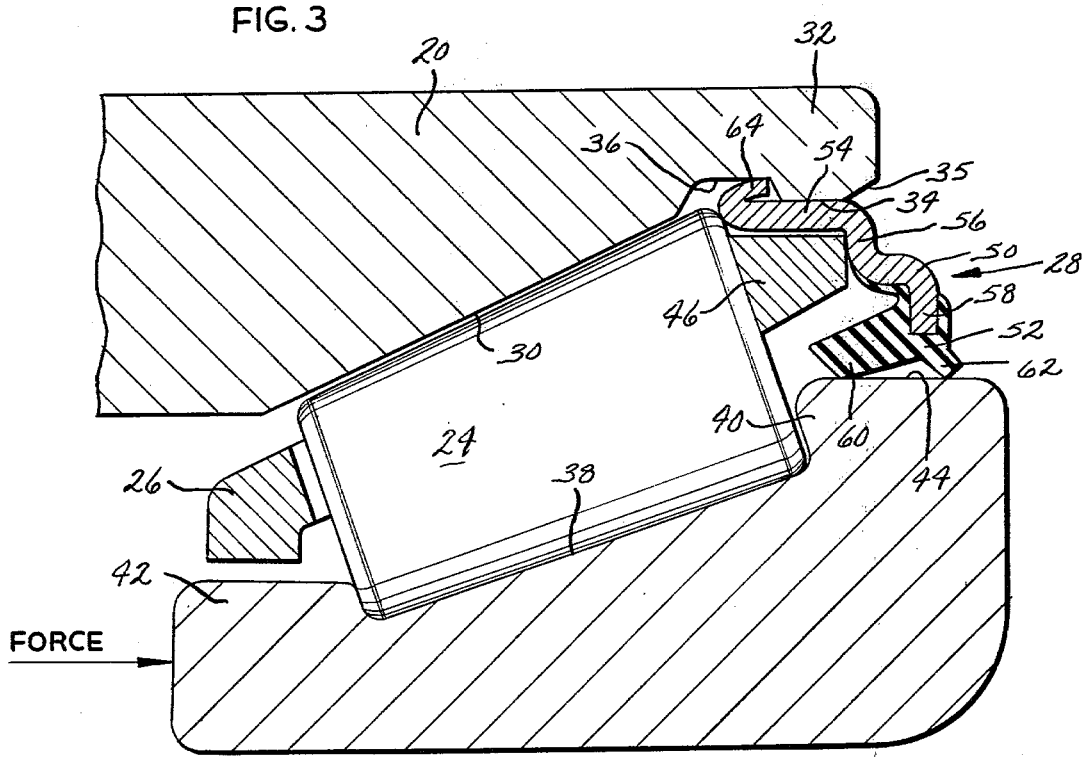
FIG. 3 is a sectional view similar to FIG. 2, but showing the cone assembly thrust axially against and being restricted by the seal.

With further regard to the seal case 50, its radial wall 56 is spaced from the large end ring 46 of the adjacent cage 26, yet axially aligns with the end ring 46. The arrangement is such that if the cone assembly is withdrawn a short distance, the end ring 46 will come against the radial wall 56 before the rollers 24 interfere with the grease lip 60 of the elastomeric seal element 52 (FIG. 3). Moreover, the end ring 46 will be beyond the grease lip 60. This prevents both the cage 26 and the rollers 24 from damaging the grease lip 60 of the seal element 52.

At its end opposite from the radial wall 56, the cylindrical outer wall 54 is formed integral with a curl or locking lip 64 that is turned backwardly and overlies the outwardly presented surface of the cylindrical wall 54. The locking lip 64 lies entirely within the undercut 36 at the end of the end bore 34 in the cup 20 and is thin enough to avoid permanently deflecting the cylindrical wall 54 inwardly and thereby lessening the effectiveness of the interference fit between that wall and the surface of the end bore 34. The locking lip 64 may be formed in a stamping operation or a rolling operation, and its thickness is preferably less than that of the axial wall 54. Preferably its thickness is between 0.010 and 0.020 inches. The locking lip 64 enhances the retention characteristics of seal 28 significantly, for to remove the seal from the cup 20 the lip 58 must be in effect uncurled (FIG. 4), and this requires a substantially greater force than that required to overcome the friction of the interference fit between end bore 34 and the cylindrical wall 54.

While the diameter of the bore 34 into which the cylindrical outer wall 54 of the seal case 50 fits is slightly greater than the diameter of the row of tapered rollers 24 at the outer edges of those rollers, the diameter of the outer wall 54 at the curved end surface where the locking lip 64 extends from it is slightly less than the diameter of the row of tapered rollers 24 at their outer edges. Moreover, the length of the outer wall 54 is such that when the large diameter end ring 46 of the cage 26 is at or near the radial end wall 56 of the seal case 50, the large diameter end edges of the tapered rollers 24 will be at or near the curved end surface on the outer wall 54. Thus, the rollers 24 will contact the curved end of the outer wall 54 before reaching the grease lip 60 of the seal element 52, and this provides further protection for the elastomeric seal element 52.

To assemble the bearing B, the two cone assemblies are inserted into the double cup 20 from opposite ends of the cup 20. When fully inserted, the front faces of the two cones 22 abut midway between the ends of the cup 20, and when this occurs the bearing B has the proper adjustment, which will normally be a condition of slight end play. Before the seals 28 are installed, the interior of the bearing B is provided with a supply of a suitable lubricant which is normally a grease. Thereafter, the seals 28 are forced into the ends of the cup 20.

More specifically, to install a seal 28, the free end of its cylindrical outer wall 54, that is the end with the overlying locking lip 64, is aligned with the chamfer 35 at the end of the cup extension 32. Then an axial force is applied to the seal case 50 at its radial end wall 56. The force must be sufficient to contract the cylindrical outer wall 54 at the chamfer 35 sufficiently to force it and the locking lip 64 into the end bore 34 through which it moves. In this state, the cylindrical wall 54 is contracted considerably. When the locking lip 64 reaches the undercut 36 it springs outwardly, allowing the outwardly presented surface of the cylindrical wall 54 to come against the surface of the end bore 34 so that a friction fit will exist between the cylindrical wall 54 and the cup extension 32. In this condition, the locking lip 64 is contained entirely within the undercut 36 and does not affect the friction fit between the cylindrical wall 54 and the cup extension 32. Thereafter, the bearing B is installed on the knuckle 4 and the hub 8 if it is designed for the automotive application previously described.

The seals 28 completely unitize the bearing B in that they prevent the two cone assemblies from being withdrawn from the cup 20. In the event the cones 22 are not clamped together, such as would be the case if the nut 12 was removed or backed off, then the two cones 22 may split apart. Actually, neither cone 22 can be displaced beyond the midpoint of the cup 20 for the tapered rollers 24 in effect lodge between the cone and cup raceways 30 and 38, much like wedges. In other words, the cones 22 cannot be advanced into the cup 20 further than the position they normally occupy. However, if either cone 22 is moved in the opposite direction, that is in the direction which displaces it from the cup 20, then the seal 28 at the cone 22 will prevent the withdrawal after a short distance (FIG. 3). More specifically, the cone 22 upon moving out of the cup 20 will at its retaining rib 42 come against the small diameter ends of the rollers 24 and drive the rollers 24 axially (FIG. 3). The rollers 24, in turn, will force the cage 26 axially, and it will after a short distance come against the radial end wall 56 of the seal case 50. The withdrawal force in this instance will be resisted at the radial wall 56. Also, depending upon tolerances within the bearing B, it is possible that the cone 22 will drive the rollers 24 against the curved end of the cylindrical outer wall 54, instead of driving the cage 26 against the radial wall 56, and in that instance the seal case 50 will again resist the withdrawal force, but this time at the end of the cylindrical outer wall 54.

The resistance offered by the seal case 50 is not the force required to overcome the friction fit between the cylindrical wall 54 and the surface of the end bore 34, but instead is that force plus the force necessary to uncurl the locking lip 64 on the seal case 50. In this regard, the locking lip 64, once it snaps into the undercut 36 cannot be withdrawn from the undercut 36 without curling it back into a straight line extension of the cylindrical wall 54 (FIG. 4), and this of course requires the application of an axially directed withdrawal force to the seal case 50. The seal case 50 will withstand this force, which is substantial, amounting to about 1000 pounds for an automotive wheel bearing. The retention capabilities are enough to enable the cones 22 to be stripped from the spindle 6 of the wheel hub 8 and are further enough to withstand the induced axial force that may develop under the weight of a vehicle as the result of the nut 12 being removed from the stub shaft 10.

Instead of having a stepped configuration as does the case 50 of the seal 28, a modified seal 68 (FIG. 5) has a case 70 which possesses a generally L-shaped configuration formed by a cylindrical wall 72 and a radial wall 74. Bonded to the radial wall 74 is a seal element 76 having the usual lips 78 and 80 and in addition a pad 82 which is located directly opposite to the large end ring 46 on the bearing cage 26. The end ring 46 contacts the pad 82 before the rollers 24 come against the grease lip 78 and accordingly the lip 78 is preserved. The seal case 70 has a curled back locking lip 84 on the opposite end of its cylindrical wall 72, and that lip snaps into the undercut 36 of the cup 20 in the manner previously described.

Figure 7:
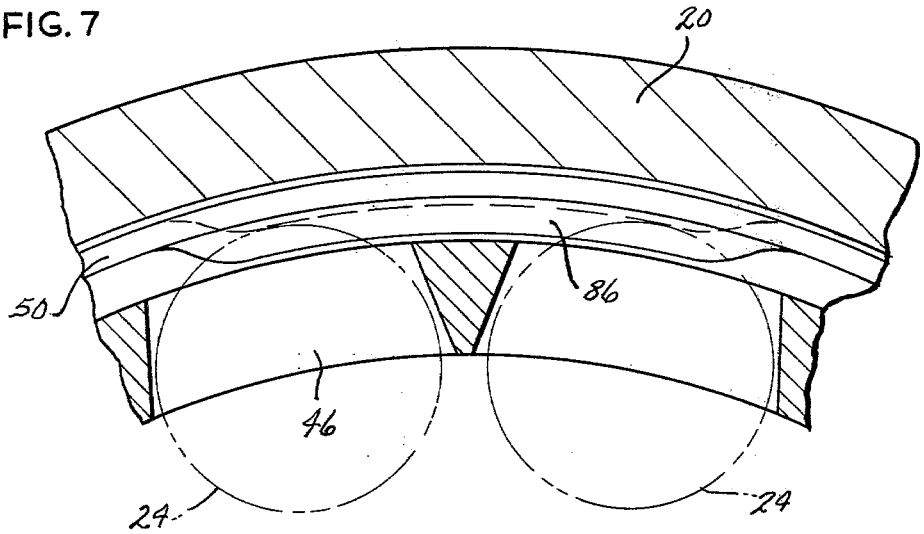
FIG. 7 is a sectional view taken along line 7—7 of FIG. 6.

Also where the cylindrical outer wall 72 of the seal case 70 and the end bore 34 have a somewhat greater diameter than the outer edge of the row of rollers 24, the outer wall 72 may be provided with bosses 86 (FIG. 6) that project radially inwardly from the outer wall 72 to a diameter less than that of the row of rollers 24 at the edges of the large diameter ends of those rollers 24. The bosses 86 should be arranged at equally spaced intervals and each should be long enough to exceed the spacing between the centers of two adjacent rollers 24 (FIG. 7) so that at least one roller 24 will be located opposite each boss 86 at all times. Thus, depending on the tolerances in the bearing, the end edges of the rollers 24 may upon movement of the cone 22 that they encircle, engage the bosses 86 instead of the curved end surface where the outer wall 72 merges with the locking lip 84. Again the arrangement should be such that the rollers 24 will contact the bosses 86 before reaching the grease lip 78.

While the seals 28 and 68 have been described in connection with the bearing B which is particularly suited for automotive applications, they also may be used with bearings having a wide variety of other applications to unify those bearings or merely enhance the retention characteristics of the seal cases. One such application is railroad bearings of the type described in U.S. Pat. No. 3,494,682. In that type of bearing, the conventional retaining bead would be replaced by a curled back locking lip and the double cup would have a undercut capable of accommodating the locking lip. Furthermore, the seals 28 and 68 are useful on single row bearings as well as multirow bearings.

Also, the end bore 34 into which the cylindrical outer wall 54 of the seal case 50 fits need not be in the bearing cup, but instead may be in a structure located beyond the end of the bearing cup. For example, the bore that receives the outer wall 54 of the seal case 50 may be the same bore into which the cup of the bearing is pressed, in which case the undercut 36 would be in that bore. By the same token, the cup or outer race for the bearing B need not be a unitary structure, but could be two individual cups separated by a shoulder in a hub.

This invention is intended to cover all changes and modifications of the example of the invention herein chosen for purposes of the disclosure which do not constitute departures from the spirit and scope of the invention.

What is claimed is:

1. A bearing arrangement comprising: inner and outer races having opposed raceways between which a space exists, a retention surface at the end of one of the races and an undercut opening out of the retention surface; rolling elements arranged in a row between the raceways of the two races to enable the races to rotate relative to each other; closure means for generally closing the space between the two races, the closure means including a metal element having a wall that is frictionally engaged with the retention surface at the end of said one race and a locking lip that extends from the wall and is doubled back with respect to the wall, the locking lip being located within the undercut.

2. A bearing arrangement according to claim 1 wherein the configurations of the undercut and the locking lip are such that the lip will uncurl into a generally straight continuation of the wall when an extraction force of sufficient magnitude is exerted on the closure means.

3. A bearing arrangement according to claim 1 wherein the closure means comprises a metal seal case on which the wall and the locking lip are located.

4. A bearing arrangement according to claim 3 wherein the closure means further comprises an elastomeric seal element which is attached to the seal case and has a lip which contacts the other race.

5. A bearing arrangement according to claim 4 wherein the raceways and rolling elements are configured and oriented such as to transfer a thrust load through the rolling elements with the rolling elements seated fully against the raceways; and wherein the seal case prevents the rolling elements from contacting the lip of the elastomeric seal element when the other race is shifted in a direction which causes the rollers to move out of the fully seated condition on the raceways.

6. A bearing arrangement according to claim 3 wherein the retention surface at the end of said one race and the wall on the seal case are substantially cylindrical.

7. A bearing arrangement according to claim 6 wherein the retention surface forms a bore that opens out of the outer race and the locking lip of the seal case is turned outwardly and is doubled back over the cylindrical wall of the seal case.

8. A bearing comprising: an outer race having an inwardly presented raceway, a cylindrical retention surface, and an annular undercut located along the retention surface such that the retention surface is between one end of the bearing and the undercut; an inner race located within the outer race and having an outwardly presented raceway located opposite to the inwardly presented raceway of the outer race; rolling elements arranged in a row between the raceways of the two races for enabling one of the races to rotate relative to the other race, the rolling elements along with the two raceways, being configured and oriented to transfer a radial load from one race to the other through the rolling elements and to further transfer a thrust load from one race to the other through the rolling elements when the thrust load is directed such that it seats the rolling elements against the raceways; a metal end member at the end of the bearing at which the retention surface is located, the end member having a cylindrical wall and a locking lip that is doubled back upon the cylindrical wall, the cylindrical wall being snugly fitted against the cylindrical retention surface and the locking lip being in the undercut, whereby the end member is secured firmly to the outer race, the end member preventing the inner race from being withdrawn from the outer race in the direction opposite to that which causes the rolling elements to seat against the raceways.

9. A bearing according to claim 8 and further comprising an elastomeric seal element attached to the metal end member and having a lip that contacts the inner race, whereby the end of the bearing is closed.

10. A bearing according to claim 8 wherein the retention surface is the surface of a cylindrical bore that opens out of the outer race beyond the raceway and the undercut is an annular groove that opens inwardly between the end of the raceway and surface of the bore.

11. A bearing according to claim 8 wherein the raceways and the rolling elements are tapered, and the retention surface is at that end of the bearing toward which the large end of the tapered raceway on the outer race is presented.

12. A bearing according to claim 9 wherein metal end member prevents the rolling elements from contacting the lip of the elastomeric seal element.

13. A bearing according to claim 11 and further comprising a cage configured to maintain the proper spacing between the rollers and to hold the rollers around the inner race when the inner race is out of the outer race; and wherein the metal end member has inwardly directed bosses which align with the ends of at least some of the tapered rollers such that the rollers are blocked from moving out of the bearing by the bosses.

14. A bearing according to claim 13 and further comprising an elastomeric seal element attached to the metal end member and contacting the inner race; and wherein the rollers are blocked by the bosses before contacting the seal element.

15. A bearing according to claim 8 and further comprising an elastomeric seal element which is attached to the metal member and has a lip that contacts the inner race; wherein the cage includes a large diameter end ring that extends past the large diameter ends of the rollers; and wherein the large end ring of the cage will contact the closure member and be blocked thereby before the rollers come against the lip of the elastomeric seal element.

16. A seal for a bearing arrangement having inner and outer races separated by rolling elements and further having an end bore at the end of the outer race and an undercut that opens into the bore, said seal unit comprising a metal seal case having a cylindrical wall of a diameter slightly greater than the diameter of the end bore, so that the cylindrical wall will fit into the bore with a friction fit; a locking lip at the end of the wall and being doubled back and overlying the cylindrical wall, the locking lip being small enough to fit into the undercut without diminishing the friction fit between the cylindrical wall and the end bore; and an elastomeric seal element bonded to the seal case.

17. A seal according to claim 16 wherein the seal case includes a radial wall which extends radially inwardly from the other end of the cylindrical wall; and wherein the elastomeric seal element is located generally at the inner margin of the radial wall.

18. A seal according to claim 17 wherein the seal case further includes an offset portion that is projected axially beyond the radial wall and the elastomeric seal element is bonded to the offset portion.

19. A seal according to claim 16 wherein the locking lip is formed integral with the cylindrical wall and is thinner than the cylindrical wall.

* * * * *